United States Patent
Shahriari et al.

(10) Patent No.: US 11,814,098 B2
(45) Date of Patent: Nov. 14, 2023

(54) METHODS, SYSTEMS, AND APPARATUSES FOR IDENTIFICATION AND COMPENSATION OF TRAILER IMPACTS ON STEERING DYNAMICS FOR AUTOMATED DRIVING

(71) Applicant: GM GLOBAL TECHNOLOGY OPERATIONS LLC, Detroit, MI (US)

(72) Inventors: Mohammadali Shahriari, Markham (CA); Amir Takhmar, Toronto (CA); Reza Zarringhalam, Whitby (CA); Klaus Trangbaek, Moshav Ein Vered (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 17/198,851

(22) Filed: Mar. 11, 2021

(65) Prior Publication Data
US 2022/0289292 A1    Sep. 15, 2022

(51) Int. Cl.
| | | |
|---|---|---|
| *B62D 13/02* | (2006.01) | |
| *B62D 5/04* | (2006.01) | |
| *B62D 15/02* | (2006.01) | |
| *B60D 1/24* | (2006.01) | |

(Continued)

(52) U.S. Cl.
CPC ............ *B62D 13/025* (2013.01); *B60D 1/248* (2013.01); *B62D 5/0463* (2013.01); *B62D 15/025* (2013.01); *B60D 1/62* (2013.01); *B60W 30/12* (2013.01)

(58) Field of Classification Search
CPC .... B62D 5/0463; B62D 15/025; B60W 30/12
See application file for complete search history.

(56) References Cited

U.S. PATENT DOCUMENTS

| | | | |
|---|---|---|---|
| 9,956,965 B1 | 5/2018 | Hall et al. | |
| 2021/0347409 A1* | 11/2021 | Nakano | B62D 13/00 |

(Continued)

FOREIGN PATENT DOCUMENTS

WO    2020003597 A1    1/2020

OTHER PUBLICATIONS

Yongling, He. Dec. 31, 2013. Automotive electronic Control Technology. Press of Beijing University of Aeronautics and Astronautics. An English summary is provided for the pages to consider.

*Primary Examiner* — Jeff A Burke
*Assistant Examiner* — Jerrod Irvin Davis
(74) *Attorney, Agent, or Firm* — Lorenz & Kopf LLP

(57) ABSTRACT

In various embodiments, methods, systems, and vehicle apparatuses are provided. A method for adaptive control of electronic power steering (EPS) including sending, a torque control to an EPS that is based on input control signals from a vehicle trajectory control unit and a steering assistive control unit when the vehicle is coupled to a trailer engaging in a trailering action; configuring the steering assistive control unit, to generate a control signal based on an algorithm using an adaptive factor that models steering dynamics impacted by the trailer while engaging in the trailering action and modeling by the steering assistive control unit, an adaptive damping factor modeled on a tongue weight of a trailer coupled to a hitch of the vehicle wherein the hitch reduces a force applied to a vehicle front axle.

20 Claims, 6 Drawing Sheets

(51) Int. Cl.
*B60W 30/12* (2020.01)
*B60D 1/62* (2006.01)

(56) References Cited

U.S. PATENT DOCUMENTS

2022/0135041 A1* 5/2022 Heseding ............ B60R 16/0231
  701/22
2022/0266831 A1* 8/2022 Donnevert ...... B60W 30/18163

* cited by examiner

METHODS, SYSTEMS, AND APPARATUSES FOR IDENTIFICATION AND COMPENSATION OF TRAILER IMPACTS ON STEERING DYNAMICS FOR AUTOMATED DRIVING

INTRODUCTION

The technical field generally relates to steering assist methods, systems, and apparatuses and more particularly relates to methods, systems, and apparatuses for estimating steering characteristics for torque control of a vehicle electronic power steering control impacted by tongue weight of a trailer and to perform automated, autonomous, and assistive maneuvers while a trailer is attached.

Recent years have seen significant advancements in autonomous and semi-autonomous driving features in land driven vehicles, such as Super Cruise (a hands-free semi-autonomous driver assistance feature that uses high-definition maps and sensors watching the road to assist with accelerating, and decelerating a vehicle), LKA (lane-keeping assist, which is a semi-autonomous driving feature that assists with the steering to keep a vehicle within the lane boundaries or centered in a lane), and others. Vehicles may still be improved in a number of respects.

The swaying when towing a trailer can cause load transfers and lateral hitch forces and the forces exhibited from the trailering actions impact the amount of tire contact patch with the road surface, the self-aligning torque, and the side slip of the vehicle. When engaging in vehicular trailering, the trailer's movement and other steady-state hitch forces cause changes in the steering dynamics of the towing vehicle such as reducing the tracking performance of the steering's Lane Centering Control (LCC) and adding jittering qualities to the steering wheel operation. The ability to compensate for these deleterious effects in the steering dynamics suffers from certain impediments including the absence of knowledge of trailer parameters and states, and the difficulty to identify easily the dynamics of the trailer.

It is desirable to implement an adaptive model and controller that can automatically update steering control policy and parameters when a trailer is detected.

It is desirable to enable an adaptation policy that identifies trailer parameters, actuation effort, upcoming road geometry and can proactively modify steering plant and control architecture. This adaptation may be implemented by use of associated steering modeling and modifying automated steering operational functions in response to the added conditions caused by the trailer and the operating environment.

It is desirable for adaptive control structures, policy, and implementation for automated and assistive steering that contributes to desirable path following and lane-keeping features, and other active Safety and automated Driving features.

Furthermore, other desirable features and characteristics of the present invention will become apparent from the subsequent detailed description and the appended claims, taken in conjunction with the accompanying drawings and the foregoing technical field and background.

SUMMARY

A method, system, and apparatus for adaptive control structures, policy, and implementation for automated and assistive steering for a vehicle while a trailer is attached are disclosed.

In one exemplary embodiment, a method for adaptive control of electronic power steering (EPS) is provided. The method includes sending, by a steering control unit disposed of in the vehicle, a torque control to an EPS that is based input control signals from a vehicle trajectory control unit and an steering assistive control unit when the vehicle is coupled to a trailer engaging in a trailering action; configuring the steering assistive control unit, to generate a control signal based on an algorithm using an adaptive factor that models steering dynamics impacted by the trailer while engaging in the trailering action; modeling by the steering assistive control unit, an adaptive damping factor modeled on a tongue weight of a trailer coupled to a hitch of the vehicle wherein the hitch reduces a force applied to a vehicle front axle; receiving, by the steering assistive control unit, a set of forces exhibited by the trailer coupled to the hitch of the vehicle including at least one lateral force affecting lateral dynamics of the vehicle and angular movement of the vehicle while engaging in the trailering action; and generating, by the steering assistive control unit, a control signal for applying a torque-assist to the EPS wherein the algorithm using the adaptive factor to compensate for the at least one lateral force by a gain applied by the damping factor based on a torque force modeled by a transfer function that is at least proportional to the tongue weight.

In at least one exemplary embodiment, the method includes applying, by the steering assistive control unit, a damping factor based on the transfer function to compensate for a set of unknown hitch forces and load transfers by the trailer while engaging in the trailering action.

In at least one exemplary embodiment, the method includes configuring, by the steering assistive control unit, an off-line algorithm for use in modeling an adaptive damping factor modeled on a tongue weight of a current trailer coupled to a hitch of the vehicle with a set of known tongue weights.

In at least one exemplary embodiment, the method includes configuring an off-line algorithm for use by modeling an adaptive damping factor by comparing a tongue weight of a current trailer coupled to a hitch of the vehicle with a set of known tongue weights that have been determined by off-line training wherein the vehicle is currently in a pre-production state.

In at least one exemplary embodiment, the method includes identifying, by the steering assistive control unit, an impact of the tongue weight by comparing the angular velocity of the vehicle and a self-aligning torque (SAT).

In at least one exemplary embodiment, the method includes the identified impact of the tongue weight in comparisons to the angular velocity of the vehicle and the self-aligning torque (SAT) is performed in-production of the vehicle.

In at least one exemplary embodiment, the method includes calibrating, by the steering assistive control unit, a feed-forward unit of the steering control by comparisons at least of the angular velocity of the vehicle and a self-aligning torque (SAT).

In at least one exemplary embodiment, the method includes using, by the steering unit, a model based on at least the calibrated feed-forward unit, and angular velocity of the vehicle.

In another exemplary embodiment, a system is provided. The system includes a processing unit disposed of in a vehicle including one or more processors configured by programming instructions encoded on non-transient computer-readable media for adaptive control of electronic power steering (EPS) configured to: send a torque control to the EPS that is based on input control signals from a vehicle trajectory control system and an adaptive EPS damping factor algorithm when the vehicle is coupled to a trailer engaged in a trailering action; configure the adaptive EPS damping factor algorithm to generate a control signal using an adaptive factor that models steering dynamics impacted by the trailer while engaged in the trailering action; model an adaptive damping factor on a tongue weight of a trailer coupled to a hitch of the vehicle wherein the hitch reduces a force applied to a vehicle front axle; receive a set of forces exhibited by the trailer coupled to the hitch of the vehicle including at least one lateral force affecting lateral dynamics of the vehicle and angular movement of the vehicle while engaged in the trailering action; and generate a control signal for applying a torque-assist to the EPS wherein the adaptive EPS damping factor algorithm changes the adaptive factor to compensate for the at least one lateral force by a gain applied by the damping factor based on a torque force modeled by a transfer function that is at least proportional to the tongue weight.

In at least one exemplary embodiment, the system includes the processing unit configured to apply the damping factor based on the transfer function to compensate for a set of unknown hitch forces and load transfers by the trailer while engaged in the trailering action.

In at least one exemplary embodiment, the system includes the processing unit configured to configure an off-line algorithm for use modeling an adaptive damping factor modeled on a tongue weight of a current trailer coupled to a hitch of the vehicle with a set of known tongue weights.

In at least one exemplary embodiment, the system includes the processing unit configured to identify the tongue weight by comparing the angular velocity of the vehicle and a self-aligning torque (SAT) an off-line algorithm for use modeling an adaptive damping factor modeled on a tongue weight of a current trailer coupled to a hitch of the vehicle with a set of known tongue weights.

In at least one exemplary embodiment, the system includes the processing unit configured to calibrate a feed-forward unit for the adaptive steering control by comparing at least the angular velocity of the vehicle and a self-aligning torque (SAT).

In at least one exemplary embodiment, the system includes the processing unit configured to use a model based on at least the calibrated feed-forward unit, and angular velocity of the vehicle.

In yet another exemplary embodiment, a vehicle apparatus, including a steering assist unit including one or more processors and non-transient computer-readable media encoded with programming instructions, the steering assist unit for adaptive control of electronic power steering (EPS) is provided. The steering assist unit is configured to: send a torque control to the EPS that is based on input control signals from a vehicle trajectory control system and an adaptive EPS damping factor algorithm when the vehicle is coupled to a trailer engaged in a trailering action; configure the adaptive EPS damping factor algorithm to generate a control signal using an adaptive factor that models steering dynamics impacted by the trailer while engaging in the trailering action; model an adaptive damping factor on a tongue weight of a trailer coupled to a hitch of the vehicle wherein the hitch reduces a force applied to a vehicle front axle; receive a set of forces exhibited by the trailer coupled to the hitch of the vehicle including at least one lateral force affecting lateral dynamics of the vehicle and angular movement of the vehicle while engaged in the trailering action; and generate a control signal for applying a torque-assist to the EPS wherein the adaptive EPS damping factor algorithm changes the adaptive factor to compensate for the at least one lateral force by a gain applied by the damping factor based on a torque force modeled by a transfer function that is at least proportional to the tongue weight.

In at least one exemplary embodiment, the vehicle apparatus includes the steering assist unit configured to apply the damping factor based on the transfer function to compensate for a set of unknown hitch forces and load transfers by the trailer while engaged in the trailering action.

In at least one exemplary embodiment, the vehicle apparatus includes the steering assist unit configured to: configure an off-line algorithm for use modeling an adaptive damping factor modeled on a tongue weight of a current trailer coupled to a hitch of the vehicle with a set of known tongue weights.

In at least one exemplary embodiment, the vehicle apparatus includes the steering assist unit configured to: identify the tongue weight by comparing the angular velocity of the vehicle and a self-aligning torque (SAT) an off-line algorithm for use modeling an adaptive damping factor modeled on a tongue weight of a current trailer coupled to a hitch of the vehicle with a set of known tongue weights.

In at least one exemplary embodiment, the vehicle apparatus includes the steering assist unit configured to: calibrate a feed-forward unit for the adaptive steering control by comparing at least the angular velocity of the vehicle and a self-aligning torque (SAT).

In at least one exemplary embodiment, the vehicle apparatus includes the steering assist unit configured to: generate steering control torque based at least on a set of inputs including at least a predicted dynamics of the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

Autonomous and semi-autonomous vehicles are capable of sensing their environment and navigating based on the sensed environment. Such vehicles sense their environment using multiple types of sensing devices such as optical cameras, radar, lidar, other image sensors, and the like. In such vehicles, the sensed data can be fused together with map data and vehicle sensors (Inertial Measurement unit, vehicle speed sensors, etc.) to identify and track vehicle trajectory tracking performance based on road geometry.

In various exemplary embodiments, the present disclosure describes methods, systems, and apparatuses for adaptive control structure, policy, and optimization for automated and assistive steering while a trailer is attached.

In various exemplary embodiments, the present disclosure describes methods, systems, and apparatuses for automated and assistive steering while a trailer is attached to identify the impact of trailer dynamics on steering control, to enhance steering characteristic identification processes when trailering, and to compensate for unknown hitch forces and load transfers by adaptive control structures when trailering.

Figure 1:
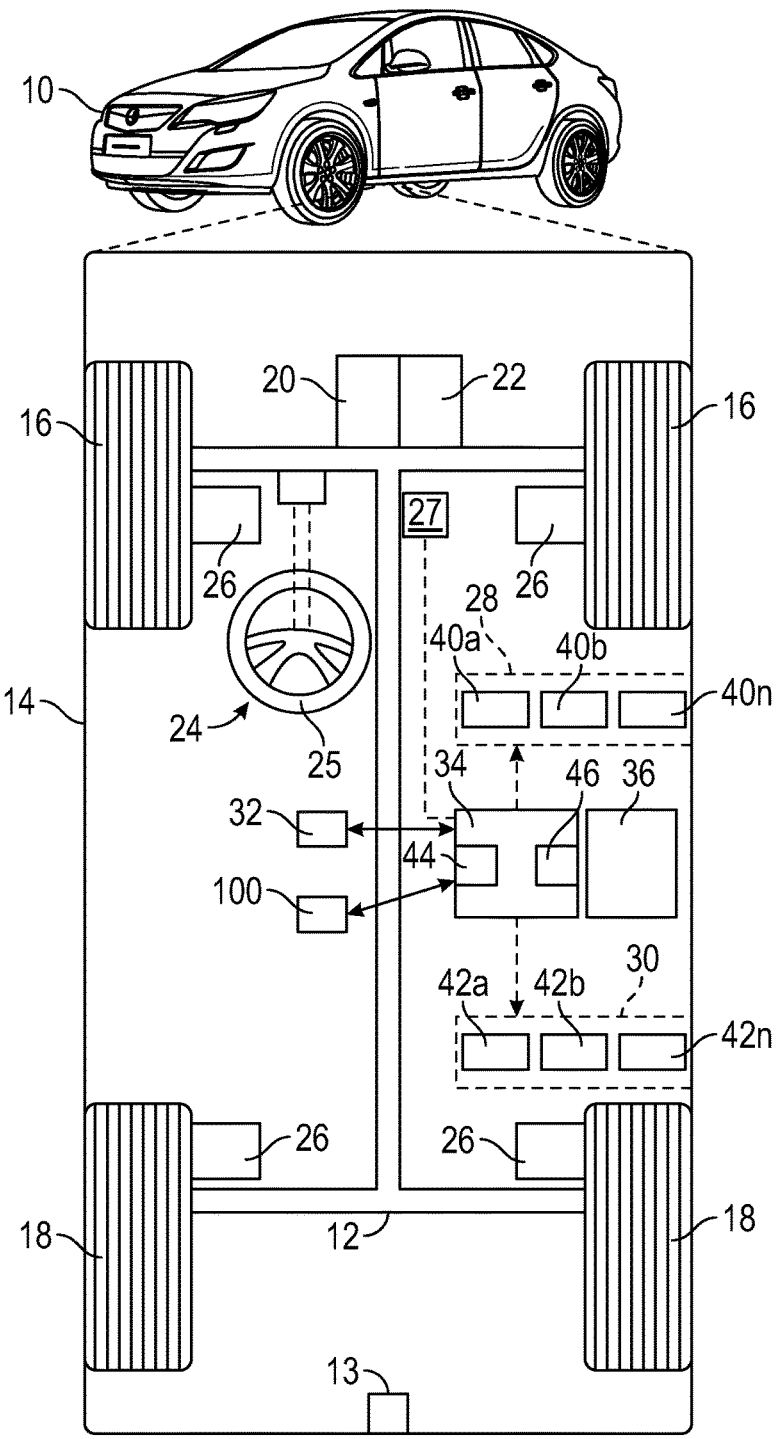
FIG. 1 illustrates a block diagram depicting an example vehicle that may include a processor for the steering assistive control system in accordance with an exemplary embodiment.

FIG. 1 illustrates a block diagram depicting an example vehicle that may include a processor for the steering assistive control system in accordance with an exemplary embodiment.

In an exemplary embodiment, the steering assistive control system 100 ("system") provides adaptations for automated and assistive steering while a trailer is attached, and that that identifies the impact of trailer dynamics on steering control. The steering assistive control system provides the methodology for steering characteristic identification method that models the steering dynamics considering trailer's impact and provides the methodology for compensation of unknown hitch forces and load transfers in an adaptive control structure The steering assistive control system 100 implements continued automated steering features that correspond to a driver's perception of "safety" and changes based on the vehicle position within the lane boundary and road geometry and conditions. For example, in an exemplary embodiment, when the vehicle is in a safer operating condition, drivers will perceive less necessity of steering control, and expect reduced effort to stop intervention. Accordingly, the system 100 reduces the driver's effort in utilizing a hands-on automated steering feature. This, in turn, reduces the driver's overall annoyance of hands-on steering control, when driver intent differs from that of the automated driving feature, that has been implemented by the system 100 when the vehicle is operating in a safe condition.

In an exemplary embodiment, the system 100 implements continued automated steering features that can correspond to a driver's perception of "safety" changes based on the vehicle position and lane conditions. The system 100, when the vehicle is in a safer operating condition based on the vehicle position within the lane boundary and/or road geometry and lane conditions, will react to the driver's perception of less necessity of steering control, and expected reduction in effort required to stop an intervention. The system 100 may also reduce driver effort when utilizing other related hands-on automated steering features to reduce the overall annoyance of hands-on steering control when the vehicle is in such safe conditions.

As depicted in FIG. 1, the vehicle 10 generally includes a chassis 12, a body 14, front wheels (front axle impacted by the tongue weight) 16, and rear wheels 18. The body 14 is arranged on chassis 12 (with hitch 13 coupled to a trailer tongue) and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car. Still, it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, the vehicle 10 may also include interior and/or exterior vehicle features not illustrated in FIG. 1, such as various doors, a trunk, and cabin features such as air, music, lighting, touchscreen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keepalive memory (KAM), for example. KAM is a persistent or non-volatile memory used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

For example, the system 100 may include any number of additional sub-modules embedded within the controller 34, which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
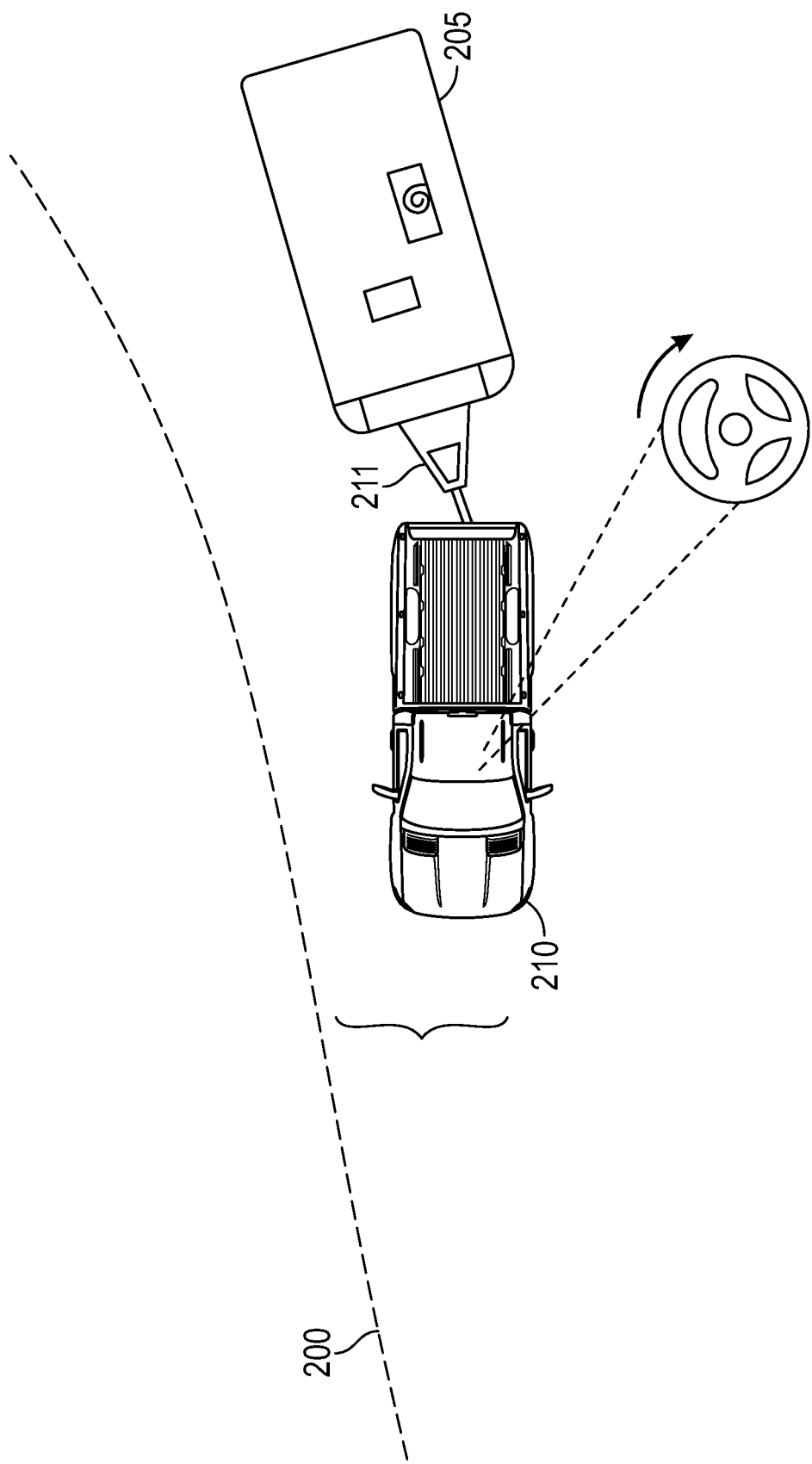
FIG. 2 depicts an exemplary scenario of trailering that is unstable in a curve for application of the steering assistive control system in accordance with an exemplary embodiment.

FIG. 2 depicts an exemplary scenario of trailering that is unstable in a curve for application of the steering assistive control system in accordance with an exemplary embodiment. In FIG. 2, a control adaption is shown for identifying and adapting a damping factor ($D_f$) for feed-forward (FF) controls. The desired trajectory is shown by the dotted curve line 200 of a vehicle 210 with trailer and trailer tongue 211. The trailer tongue 211 impacts with multiple types of dynamic forces (lateral and angular) the front axle of the vehicle 210 that causes the trajectory tracking error. The trajectory tracking error 215 is indicative of when the lane centering control (LCC) will disengage based on the road curvature, the steering control tracking, and feature condition.

Figure 3:
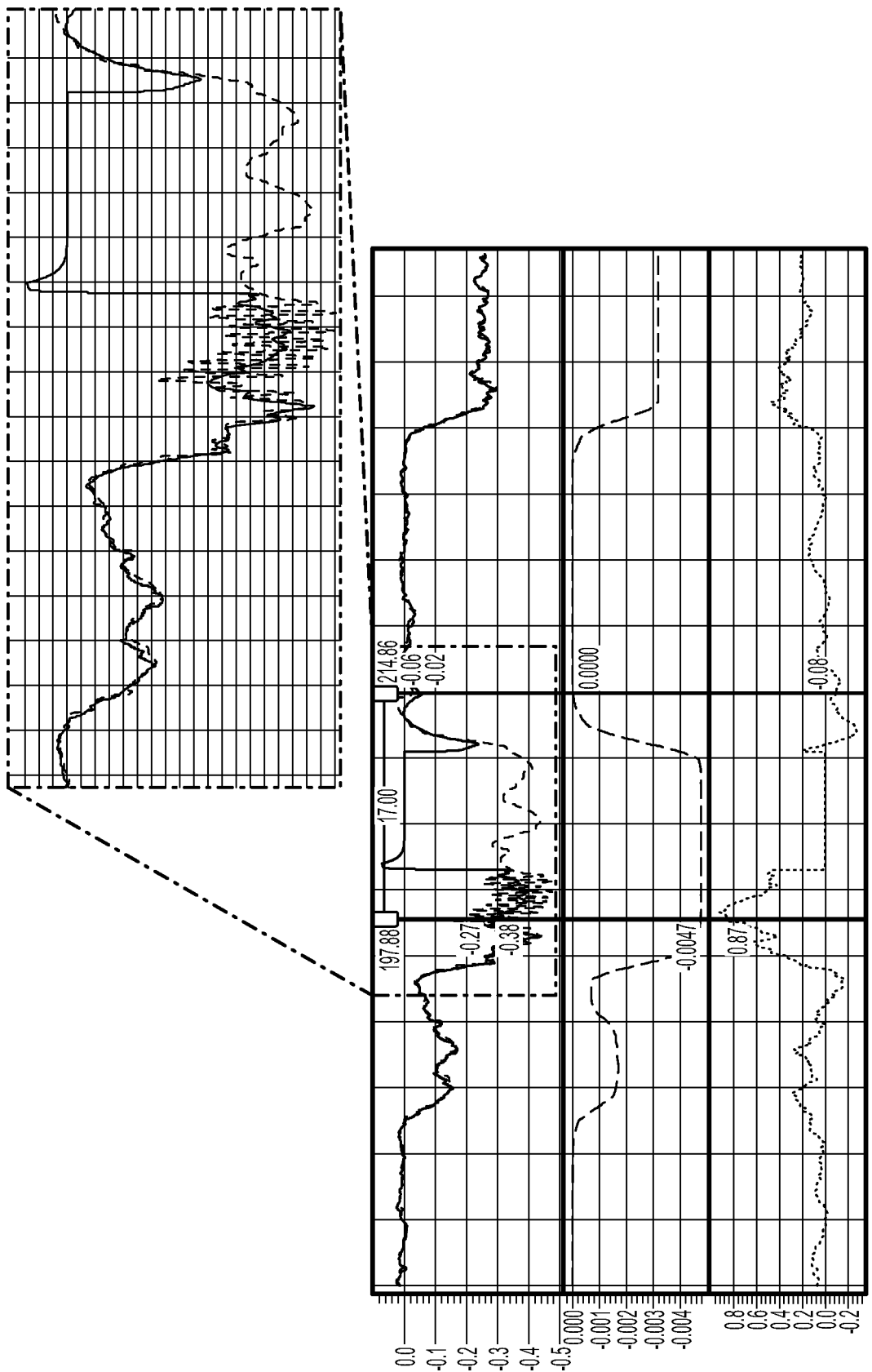
FIG. 3 is a graph that depicts a scenario when the lane centering control (LLC) disengages for applying the steering assistive controls by the adaptive damping factor in accordance with an embodiment.

FIG. 3 is a graph that depicts a scenario when the automated steering feature (ASF) disengages for applying the steering assistive controls by the adaptive damping factor in accordance with an embodiment. In FIG. 3, graph 300 depicts the ASF disengages at 310 when the trajectory tracking error ($E_{trk}$) exceeds a threshold. Also, at 315 an oscillation of the feature condition is detected.

Figure 4:
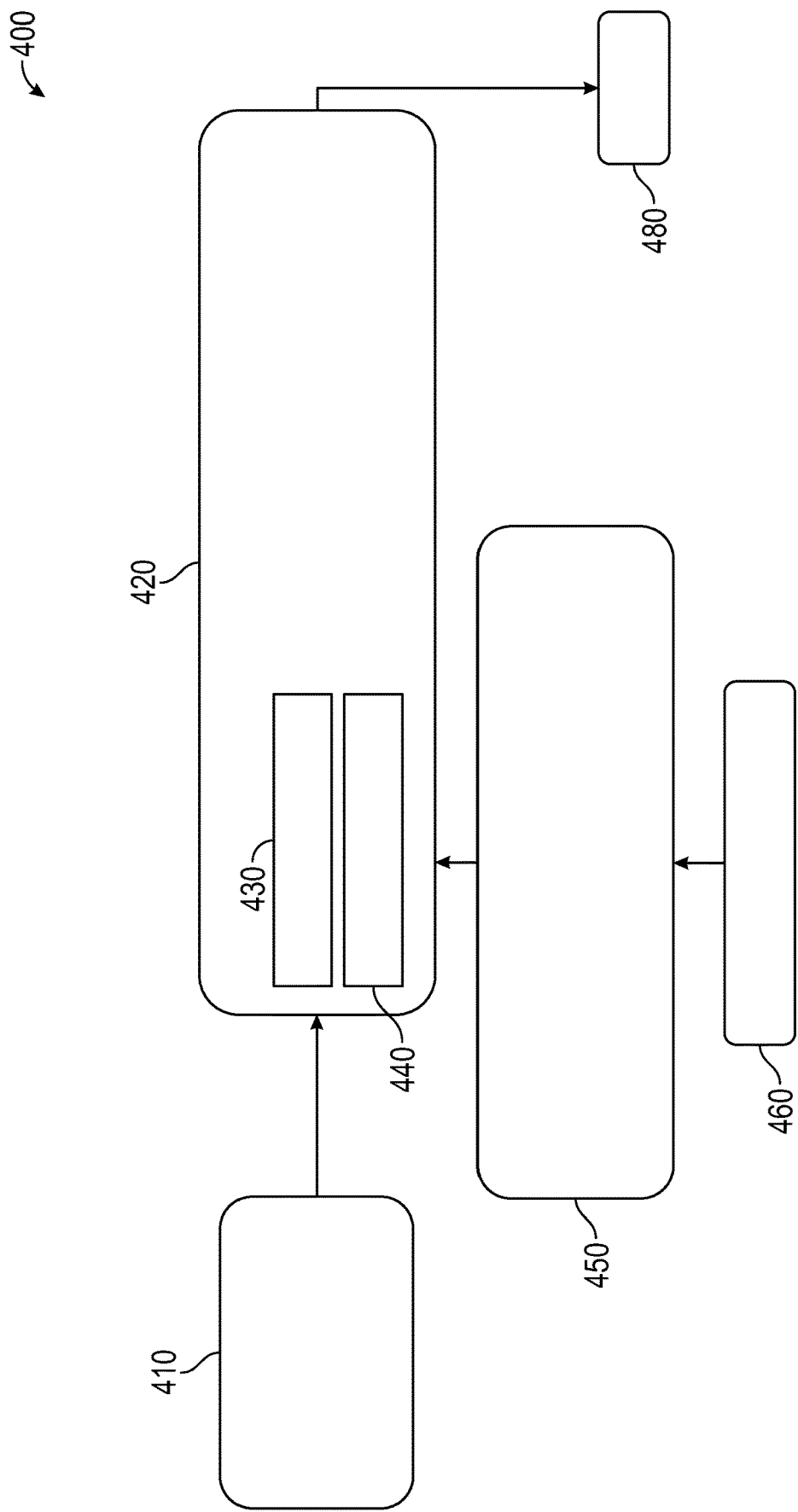
FIG. 4 is an example of a control system using the algorithm that models the EPS damping factor to generate an input control signal to the steering control unit of the vehicle when trailering in accordance with an exemplary embodiment.

FIG. 4 is an exemplary control system of the algorithm that models the EPS damping factor to generate an input control signal to the steering control unit of the vehicle when trailering in accordance with an exemplary embodiment. In FIG. 4, the EPS damping factor is calculated by the system 100 (of FIG. 1) as follows:

The trajectory control unit 410 using the algorithm $\delta_{FB} = -KE_{trk}$ and $\delta_{FF} = \rho(L + K_{us} V_x^2)$ models input for the control signal to the steering unit based on trajectory tracking error, road curvature, and steering control (See the graph of FIG. 3). The trajectory control unit generates an output $\theta_{ref} = k_s \delta_{ref}$ to the steering control unit 420. The steering control unit 420 includes a feedback control unit 430 for generating a feedback control signal of torque (in a feed-back direction) to the EPS 480 and the feedforward unit 440 for generating the feed-forward control signal of torque (in a feed-back direction) to the EPS 480. The feedback control 420 of the steering feedback control 420 applies the feedback torque $\tau_{FB} = -K_1 e - K_2 \dot{e}$ and the feedforward control unit 440 applies the feed-forward torque $\tau_{FF} = \hat{D}_f (\delta - $ $$\frac{v_y + l_f \omega_z}{v_x}) + \tau_{drvr} + \tau_{frct}.$$

The additional input torque (for example manual input by the driver) is added to the algorithm by the driver steering $\tau_{Drvr}$ and the other torque $\tau_{frct}$ is also for the total torque force applied to the vehicle.

The feedforward control unit 440 receives an input from the adapt electronic power steering (EPS) damping factor $\hat{D}_f$ when trailering. The adapt EPS damping factor $\hat{D}_f$ is modeled by the equation $$\frac{t_{EPS}}{2} + \frac{\dot{V}_x}{V_x} \tau_{EPS} = D_f \left( \dot{\delta} + \omega_z - \frac{a_y + l_f \dot{\omega}_z - \dot{V}_x \delta}{V_x} \right).$$

The adapt EPS damping factor $\hat{D}_f$ receives an input from the trailer connected. The EPS 380 receives the torque command $\tau_{cmd}$ generated by the steering control 320 based on the $e = \theta_{ref} - \theta_m$.

The model of the model or algorithm for identification and control of the trailer for the EPS torque is as follows:

$$\tau_{EPS} = J_w\ddot{\delta} + b_w\dot{\delta} + \underbrace{D_f\left(\delta - \frac{v_y + l_f\omega_z}{v_x}\right)}_{\gamma F_{yf}} + \tau_{frct}$$

The algorithm refers to the tongue weight, T, of the trailer on the hitch that reduces normal force on the front axle, and this also reduces the adaptive damping factor $D_f$ that is applied to the EPS. The lateral hitch force, $F_{yf}$, affects the lateral dynamics through $v_y$ and $\omega_z$. This force is roughly proportional to tongue weight T The parameter γ mostly depends mainly on the front suspension geometry. This model identifies the impact of trailer forces in the self-aligning torque and EPS dynamics.

Figure 5A:
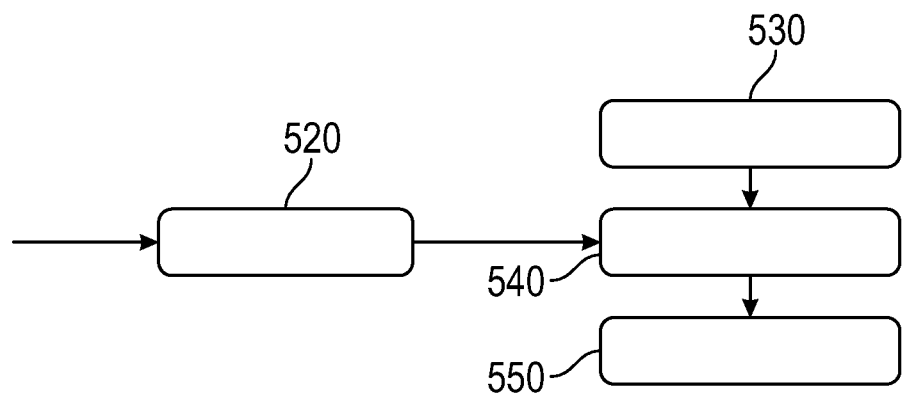
FIGS. 5A and 5B illustrate diagrams of exemplary embodiments of algorithms for identifying tongue weight and damping factors, and for steering control of the steering assistive control system in accordance with an embodiment.
Figure 5B:
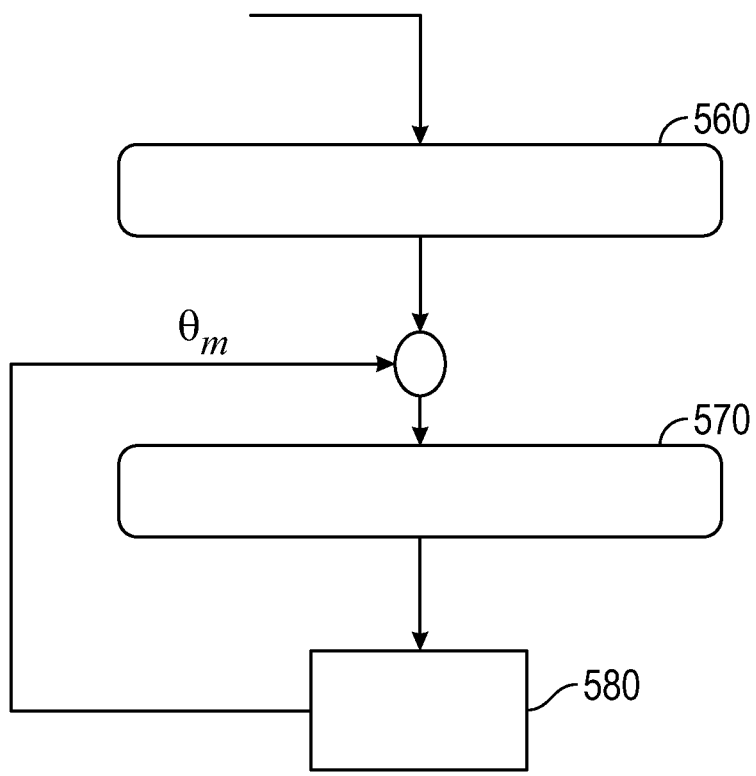

FIGS. 5A and 5B illustrate diagrams of exemplary embodiments of algorithms for identifying tongue weight and damping factors, and for steering control of the steering assistive control system in accordance with an embodiment. In FIG. 5A, a target torque algorithm is established, which is related to steering process parameters such as steering wheel angle and angular speed. The set of dynamic measurements for the algorithm include $\tau_{EPS}$, δ damping factor, vehicle speed $v_x$, and angular motion $\omega_z$, vehicle acceleration ($\alpha_y$, $\alpha_x$) from offline training are sent to identify at 520, the tongue weight T, and damping factor $D_f$ where the tongue weight T is identified by comparing $\omega_z$ and SAT to model outputs and picking the closest values for sending to the steering control 540. The trajectory control 530 is also sent as an input to the steering control 540, which in turn generates the EPS 550 state.

In FIG. 5b, the steering control adjustment based on the adaptive control system for trailer dynamics is shown. In FIG. 5B, the steering control tracking (e) is responsive to the road curvature and receives the trajectory control signal $E_{trk}$ at the trajectory control module 560. A feedback of the $\tau_{cmd}$ is sent to the EPS 580 and adjusted by the steering angle $\theta_m$ for a feature condition.

In an exemplary embodiment, a control adaptation procedure is followed that includes the steps of first configuring the algorithm for the EPS damping faction by step 1 the vehicle engaging in offline training pre-production for each set of a set of known tongue weights $T_1$, $T_2$, $T_3$ . . . and identifying the self-aligning torque (SAT), damping factor $D_f$, angular velocity $w_z$, longitudinal $V_x$ models, lateral $V_y$ models and calibrate FF control. Next in step 2 to the system identifies a tongue weight T by comparing $w_z$ and SAT to model outputs and determining the closest tongue weight of the known set. Finally in step 3, to use FF, $D_f$, and $V_y$ and model associated with the closest model of the current condition.

Figure 6:
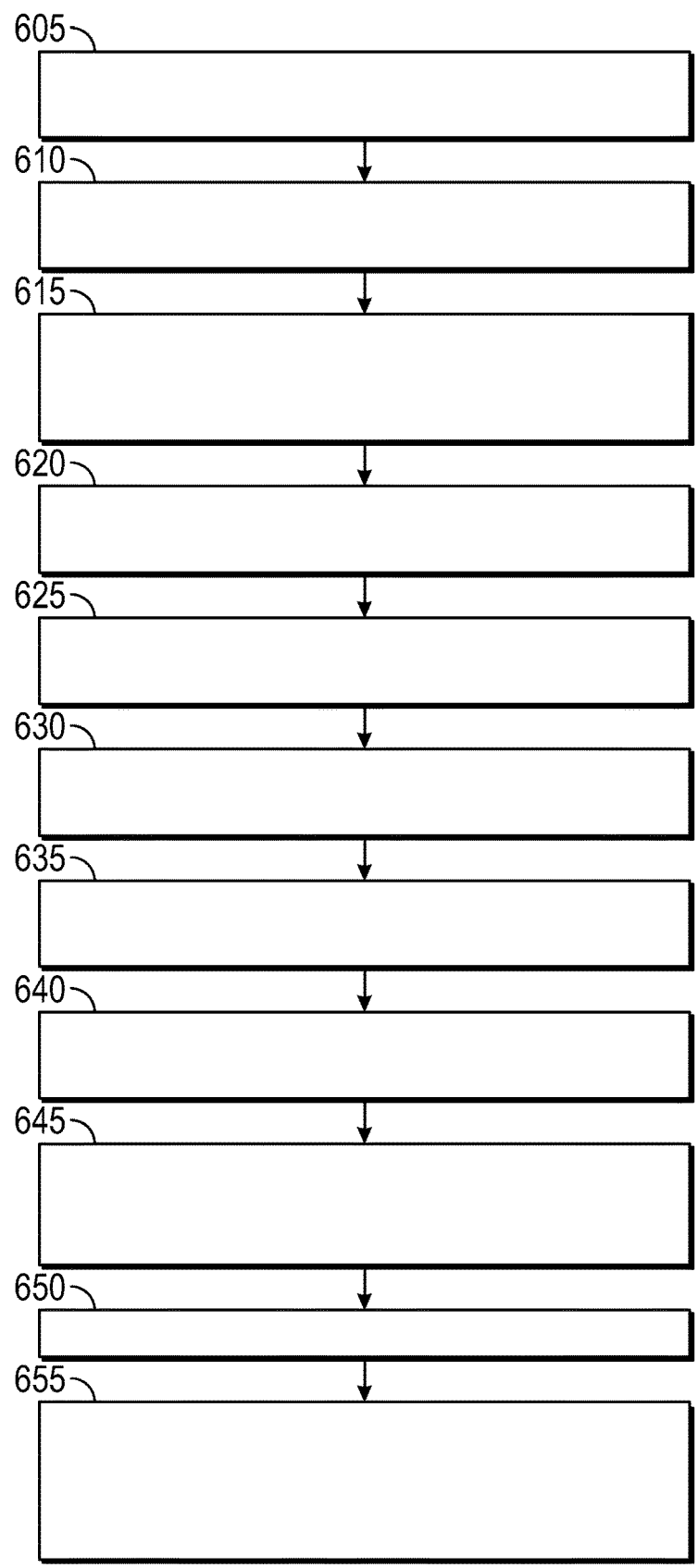
FIG. 6 illustrates an exemplary flowchart of the identification and compensation of trailer impacts on steering dynamics by the steering assistive control system in accordance with an embodiment.

FIG. 6 illustrates an exemplary flowchart of the identification and compensation of trailer impacts on steering dynamics by the steering assistive control system in accordance with an embodiment. Flowchart 600 includes the task to enable the adaptive control of electronic power steering (EPS) by the steering assistive control system ("system"). At task 605, torque control is initiated by the system to send a torque control command to an EPS for controlling a feed-forward or feed back-torque assist to a steering system and is based on input control signals from a vehicle trajectory control unit and a steering assistive control unit when the vehicle is coupled to a trailer engaging in a trailering action.

At task 610, the system configures a steering assistive control unit to generate a control signal based on an algorithm using an adaptive factor that models steering dynamics impacted by the trailer while engaging in the trailering action. At task 615, the steering assistive control unit of the system uses an adaptive damping factor that is modeled on a tongue weight of a trailer coupled to a hitch of the vehicle. The use of the hitch reduces the force applied to a vehicle's front axle. At task 620, the steering assistive control unit of the system receives a set of forces exhibited by the trailer coupled to the hitch of the vehicle where a lateral force impacts or affects the lateral dynamics of the vehicle and may also affect the angular movement of the vehicle while engaging in the trailering action.

At task 625, the steering assistive control unit of the system generates a control signal for applying a torque-assist to the EPS. The algorithm the system uses implements the adaptive factor to compensate for one or more lateral forces by an amount of gain applied by the damping factor based on a torque force modeled by a transfer function that is (dependent on) the tongue weight. At task 630, the steering assistive control unit of the system applies the algorithm using the transfer function to compensate for a set of unknown hitch forces and load transfers by the trailer while engaging in the trailering action. At task 635, the steering assistive control unit is configured for an off-line algorithm for use by modeling the adaptive damping factor modeled on a tongue weight of a current trailer coupled to a hitch of the vehicle with a set of known tongue weights. At task 640, the system configures the off-line algorithm for use by modeling an adaptive damping factor by comparing a tongue weight of a current trailer coupled to a hitch of the vehicle with a set of known tongue weights that have been determined by off-line training wherein the vehicle is currently in a pre-production state.

At task 645, the system identifies by the steering assistive control unit, an impact of the tongue weight by comparing the angular velocity of the vehicle and a self-aligning torque (SAT). The identified impact of the tongue weight in comparisons to the angular velocity of the vehicle and the self-aligning torque (SAT) is performed in-production of the vehicle.

At task 650, the system calibrates, by the steering assistive control unit, a feed-forward unit of the steering control by comparisons of at least the angular velocity of the vehicle and a self-aligning torque (SAT).

At task 655, the system uses, by the steering unit, a model based on at least the calibrated feed-forward unit, and angular velocity of the vehicle.

In an exemplary embodiment, the adaptive damping factor can be implemented with a deep neural network to inform the estimated damping factors for preproduction vehicles and in production vehicles. In this case, the tongue weights, and the models, and the algorithm would be configured as an already trained neural network. Hence, in certain embodiments, the process of the estimated damping factor of the steering control system is configured in an operational mode only. For example, in various embodiments, the deep neural network is trained during a training mode prior to use or provisioned in the vehicle (or other vehicles). Once the deep neural network is trained, it may be implemented in a vehicle (e.g., the vehicle 10 of FIG. 1) in an operational mode, in which the vehicle is operated in an autonomous, semi-autonomous or manual manner.

In various alternative exemplary embodiments, it will be appreciated that the neural network may also be implemented in both the training mode and the operational mode in a vehicle and trained during an initial operation period in conjunction with operations of conditions and events or like methodology for torque control for the EPS and for estimating damping factor. Also, a vehicle may operate solely in the operating mode with neural networks that have already been trained via a training mode of the same vehicle and/or other vehicles in various embodiments.

As mentioned briefly, the various modules and systems described above may be implemented as one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation-maximization, hierarchical clustering, etc.), and linear discriminant analysis models.

It should be appreciated that process of FIGS. 1-6 may include any number of additional or alternative tasks, the tasks shown in FIGS. 1-6 need not be performed in the illustrated order and process of the FIGS. 1-6 may be incorporated into a more comprehensive procedure or process having additional functionality not described in detail herein. Moreover, one or more of the tasks are shown in FIGS. 1-6 could be omitted from an embodiment of the process shown in FIGS. 1-6 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for adaptive control of a vehicle steering system having electronic power steering (EPS) comprising:
   sending, by a steering control command disposed of in a vehicle, a torque control to the electronic power steering (EPS) that is based on input control signals from a vehicle trajectory control unit and an adaptive set of steering dynamic characteristics factors, wherein the adaptive set of steering dynamic characteristic factors comprise friction, spring, damping, and inertia factors that are used in determining an EPS damping factor when it is determined that the vehicle is coupled to a trailer engaging in a trailering action;
   configuring the adaptive set of steering dynamics characteristics factors, to generate a control signal based on an algorithm using an adaptive factor that models steering dynamics impacted by the trailer while engaging in the trailering action;
   modeling by the adaptive set of steering dynamics characteristics factors, an adaptive spring and damping factor modeled on a tongue weight of a trailer coupled to a hitch of the vehicle wherein the hitch reduces a force applied to a vehicle front axle;
   determining, using the adaptive set of steering dynamics characteristics factors, a set of forces exhibited by the trailer coupled to the hitch of the vehicle comprising at least one lateral force affecting lateral dynamics of the vehicle and angular movement of the vehicle while engaging in the trailering action;
   generating, based on the adaptive steering dynamics characteristics factors, the control signal for applying a torque-assist to the steering system, wherein the algorithm using the adaptive factor to compensate for at least one lateral force by a gain applied by the damping and spring factors is based on a torque force modeled by a transfer function that is at least proportional to the tongue weight; and
   controlling the steering system based on the control signal.

2. The method of claim 1, further comprising:
   sending, by a steering control command disposed of in the vehicle, an angle control to the electronic power steering (EPS) that is based on input control signals from a vehicle trajectory control unit and an adaptive set of steering dynamic characteristics factors when the vehicle is coupled to a trailer engaging in a trailering action.

3. The method of claim 2, further comprising:
   applying, based on the adaptive set of steering dynamics characteristics factors, the damping and spring factors based on the transfer function to compensate for a set of unknown hitch forces and load transfers by the trailer while engaging in the trailering action.

4. The method of claim 3, wherein application of the damping and spring factors can further comprise associated steering characteristic factors to compensate for the set of unknown hitch forces and load transfers by the trailer while engaging in the trailering action.

5. The method of claim 4, further comprising:
   configuring, based on the set of adaptive steering dynamics characteristics factors, an off-line algorithm for use modeling an adaptive damping and spring factors modeled on a tongue weight of a current trailer coupled to a hitch of the vehicle with a set of known tongue weights.

6. The method of claim 5, further comprising:
   configuring an off-line algorithm for use by modeling adaptive damping and spring factors by comparing a tongue weight of a current trailer coupled to a hitch of the vehicle with a set of known tongue weights that have been determined by off-line training wherein the vehicle is currently in a pre-production state.

7. The method of claim 6, further comprising:
   identifying, by the adaptive steering dynamics characteristics factors, an impact of the tongue weight by comparing the angular velocity of the vehicle and estimating a self-aligning torque (SAT).

8. The method of claim 7, wherein an identified impact of the tongue weight in comparisons to the angular velocity of the vehicle and the self-aligning torque (SAT) is determined in-production of the vehicle.

9. The method of claim 8, further comprising:
calibrating, based on the set of adaptive steering dynamics characteristics factors, a feed-forward unit for steering control by comparisons at least of the angular velocity of the vehicle and a self-aligning torque (SAT).

10. The method of claim 9, further comprising:
using, by a steering unit, a model based on at least a calibrated feed-forward unit, and angular velocity of the vehicle.

11. A system comprising:
a processing unit disposed of in a vehicle comprising one or more processors configured by programming instructions encoded on non-transient computer-readable media for adaptive control of electronic power steering (EPS) of a steering system, the programming instructions configured to:
send a torque control to the EPS that is based on input control signals from a vehicle trajectory control system and an adaptive EPS damping factor algorithm when it is determined that the vehicle is coupled to a trailer engaged in a trailering action;
configure an adaptive EPS damping and spring factors algorithm to generate a control signal using an adaptive factor that models steering dynamics impacted by the trailer while engaged in the trailering action;
model adaptive damping and spring factors on a tongue weight of a trailer coupled to a hitch of the vehicle wherein the hitch reduce a force applied to a vehicle front axle;
receive a set of forces exhibited by the trailer coupled to the hitch of the vehicle comprising at least one lateral force affecting lateral dynamics of the vehicle and angular movement of the vehicle while engaged in the trailering action;
generate the control signal for applying a torque-assist to the steering system wherein the adaptive EPS damping and spring factors algorithm changes the adaptive factor to compensate for at least one lateral force by a gain applied by the damping and spring factor based on a torque force modeled by a transfer function that is at least proportional to the tongue weight and control the steering system based on the control signal.

12. The system of claim 11, further comprising:
the processing unit configured to:
send an angle control to the EPS that is based on input control signals from a vehicle trajectory control system and the adaptive EPS damping factor algorithm when the vehicle is coupled to the trailer engaged in a trailering action.

13. The system of claim 12, further comprising:
the processing unit configured to:
apply the damping and spring factor based on the transfer function to compensate for a set of unknown hitch forces and load transfers by the trailer while engaged in the trailering action.

14. The system of claim 13, further comprising:
the processing unit configured to:
configure an off-line algorithm for use modeling an adaptive damping factor modeled on a tongue weight of a current trailer coupled to a hitch of the vehicle with a set of known tongue weights.

15. The system of claim 14, further comprising:
the processing unit configured to:
identify the tongue weight by comparing the angular velocity of the vehicle and a self-aligning torque (SAT) an off-line algorithm for use modeling an adaptive damping factor modeled on a tongue weight of a current trailer coupled to a hitch of the vehicle with a set of known tongue weights.

16. The system of claim 15, further comprising:
the processing unit configured to:
calibrate a feed-forward unit for adaptive steering control by comparing at least the angular velocity of the vehicle and a self-aligning torque (SAT).

17. The system of claim 16, further comprising:
the processing unit configured to:
use a model based on at least the calibrated feed-forward unit, and angular velocity of the vehicle.

18. A vehicle, comprising:
a steering system configured with electronic power steering (EPS) to assist steering of the vehicle; and
a steering assist unit comprising one or more processors and non-transient computer-readable media encoded with programming instructions, the steering assist unit communicatively coupled to steering system and configured to:
send a control command comprising a torque control and an angle control to the EPS that is based on input control signals from a vehicle trajectory control system and an adaptive EPS damping and a spring factors algorithm when it is determined that the vehicle is coupled to a trailer engaged in a trailering action;
configure the adaptive EPS damping factor algorithm to generate a control signal using an adaptive factor that models steering dynamics impacted by the trailer while engaging in the trailering action;
model adaptive damping and spring factors on a tongue weight of a trailer coupled to a hitch of the vehicle wherein the hitch reduces a force applied to a vehicle front axle;
receive a set of forces exhibited by the trailer coupled to the hitch of the vehicle comprising at least one lateral force affecting lateral dynamics of the vehicle and angular movement of the vehicle while engaged in the trailering action; and
generate the control signal for applying a torque-assist to the EPS wherein the adaptive EPS damping and spring factors algorithm change adaptive factors to compensate for at least one lateral force by a gain applied by the damping factor based on a torque force modeled by a transfer function that is at least proportional to the tongue weight; and
control the steering system based on the control signal.

19. The vehicle of claim 18, further comprising:
the steering assist unit configured to:
apply the damping factor based on the transfer function to compensate for a set of unknown hitch forces and load transfers by the trailer while engaged in the trailering action.

20. The vehicle of claim 19, further comprising:
the steering assist unit configured to:
configure an off-line algorithm for use modeling adaptive damping and spring factors modeled on a tongue weight of a current trailer coupled to a hitch of the vehicle with a set of known tongue weights;
identify the tongue weight by comparing the angular velocity of the vehicle and a self-aligning torque (SAT) an off-line algorithm for use modeling the adaptive damping and spring factors modeled on a tongue weight of a current trailer coupled to a hitch of the vehicle with a set of known tongue weights;

calibrate a feed-forward unit for adaptive steering control by comparing at least the angular velocity of the vehicle and a self-aligning torque (SAT); and generate steering control torque based at least on a set of inputs comprising at least a predicted dynamic of the vehicle.

* * * * *